United States Patent [19]

Roberts

[11] 3,771,362

[45] Nov. 13, 1973

[54] FLUID VELOCITY INDICATOR
[75] Inventor: Paul C. Roberts, Pasadena, Calif.
[73] Assignee: The United States of America as represented by the Secretary of the Navy, Washington, D.C.
[22] Filed: May 25, 1972
[21] Appl. No.: 256,832

[52] U.S. Cl. ................................................. 73/229
[51] Int. Cl. ............................................. G01f 1/06
[58] Field of Search .................... 73/229, 231, 185, 73/187, 170, 189; 340/203, 206

[56] References Cited
UNITED STATES PATENTS
3,208,275  9/1965  Thornthwaite et al. .......... 73/229 X
2,962,895  12/1960  Rumble ............................ 73/231 R Primary Examiner—Richard C. Queisser
Assistant Examiner—Arthur E. Korkosz
Attorney—Richard S. Sciascia et al.

[57] ABSTRACT

A fluid velocity indicator which includes a casing having fore and aft ends. A propeller shaft is rotatably mounted through the fore end of the casing with portions of the shaft extending exterior and interior the casing. A propeller is mounted on the exterior portion of the shaft, and a light source and a light sensor are mounted within the casing in a spaced apart relationship. Means are mounted on the interior portion of the propeller shaft and movable through the space between the light source and the light sensor for coding the light transmitted to the light sensor when the propeller is rotated by the fluid. In this manner light sensed by the light sensor will enable indication of velocity and direction of fluid flow passed the propeller.

2 Claims, 4 Drawing Figures

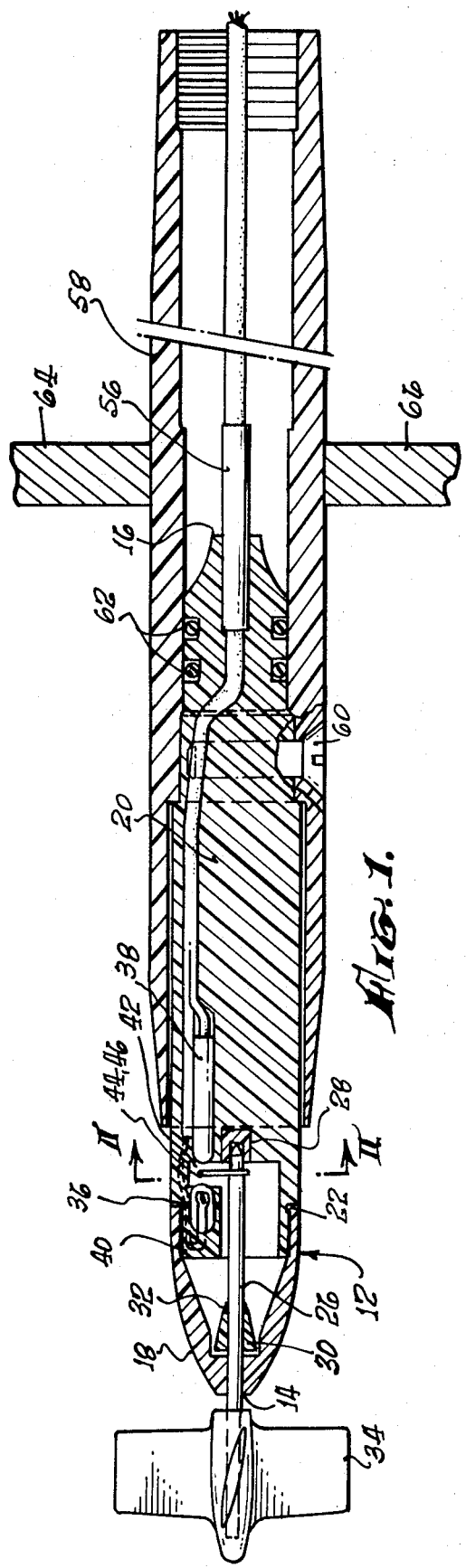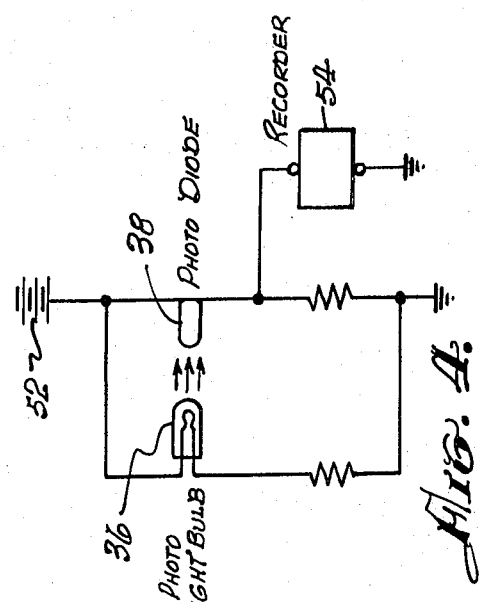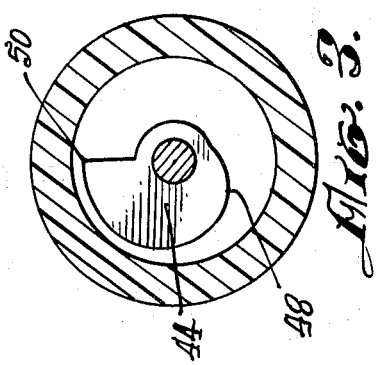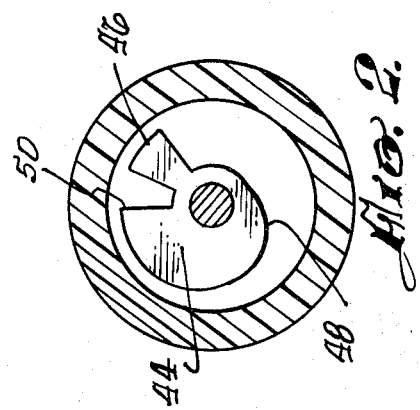

FLUID VELOCITY INDICATOR

STATEMENT OF GOVERNMENT INTEREST

This invention described herein may be manufactured and used by or for the Government of the United States of America for governmental purposes without the payment of any royalties thereon or therefor.

BACKGROUND OF THE INVENTION

Propeller-type velocity indicators have been used in water tunnels, towed models, and buoyant research for obtaining forward velocity data. In designing configurations for torpedoes and submarines it is desirable to obtain data regarding the velocity and direction of water flow passing models of these bodies. These models may be placed in a water tunnel or towed, and a velocity indicator is attached thereto for obtaining the data regarding velocity of water flow. The Navy has a need for an indicator which is quick to respond, capable of holding its calibration, and which will provide accurate water velocity data independent of the depth of operation.

In the prior art, magnetic means or photo responsive means have been used for indicating the rpm of the propeller shaft. One magnetic indicator utilizes a wire coil for sensing passage of a flattened portion of a propeller shaft. This device has been quite large, expensive, and has excessive shaft friction. Another magnetic indicator utilizes a series of coils mounted within a casing for sensing rotation of an iron core which is mounted to the propeller shaft. The response of this device has been excellent, however, end play in the shaft causes a signal change, and the device is expensive. Still another indicator has utilized a light on one side of the shaft and a photo sensitive diode on the other side of the shaft with an aperture in the shaft therebetween. This indicator has a poor response at high rpm and fades out when grease or dirt gets into the operating area. None of these prior art indicating devices will indicate direction of rotation of the propeller shaft. Indication of direction of rotation is important where there is a possibility of flow reversals.

SUMMARY OF THE INVENTION

The present invention provides a highly reliable propeller-type velocity indicator which has a minimum of shaft friction and is insensitive to any end play of the shaft. This has been accomplished by providing a velocity indicator which has a casing with fore and aft ends. A propeller shaft is rotatably mounted through the fore end of the casing with portions of the shaft extending exterior and interior the casing. A propeller is mounted on the exterior portion of the shaft, and a light source and a light sensor are mounted within the casing in a spaced apart relationship. Means are mounted on the interior portion of the propeller shaft and movable through the space between the light sensor for coding the light transmitted to the light sensor when the propeller is rotated by fluid. In this manner light sensed by the light sensor will enable indication of velocity and direction of fluid flow passed the propeller. This velocity indicator may be attached to a submerged body and will provide signals for a recorder which will indicate the velocity and direction of the water passing the submerged body. The velocity indicator would also have broad application for use in rivers where it may be mounted by an arm or similar means below the surface of the water, or in channels or pipes.

STATEMENT OF THE OBJECTS OF THE INVENTION

An object of the present invention is to overcome the aforementioned problems associated with prior art propeller-type velocity indicators.

Another object is to provide a highly reliable propeller-type velocity indicator which will more accurately sense velocity of fluid flow and the direction thereof.

A further object is to provide a propeller-type velocity indicator which is inexpensive to construct, has a minimum of shaft friction, and is insensitive to end play of the shaft.

Other objects and many of the attendant advantages of this invention will be readily appreciated as it becomes better understood by reference to the description and accompanying drawing which follows.

BRIEF DESCRIPTION OF THE DRAWING

FIG. 1 is a longitudinal cross sectional view through a preferred embodiment of the propeller-type velocity indicator.

FIG. 2 is a view taken along plane II—II of FIG. 1.

FIG. 3 is a view similar to FIG. 2 showing another embodiment of the invention.

FIG. 4 is a schematic illustration of electric circuitry which may be used in conjunction with the fluid velocity indicator.

DESCRIPTION OF THE PREFERRED EMBODIMENT

Referring now to FIG. 1 there is shown a propeller-type velocity indicator 10 which includes a casing 12 which has fore and aft ends 14 and 16 respectively. The casing 12 may include a forward cap-type hollow portion 18 and a rear solid portion 20. Both casing portions 18 and 20 may be made of plastic with the cap portion 18 having sufficient resiliency so as to snap-lock into an annular groove of the rear portion 20 at 22.

A propeller shaft 26 is rotatably mounted through the fore end of the cap portion 18 with portions of the shaft extending exterior and interior the casing. The aft end of the propeller shaft 26 may be mounted within a Teflon bearing 28 which in turn may be press-fitted within an annular cavity or cast within the solid portion 20 of the casing. A Teflon bearing 30 may be mounted within the cap portion 18 immediately aft of the front end of the cap, and the shaft 26 may be prevented from forward movement by an annular soldered projection 32.

A propeller 34 is mounted on the exterior portion of the shaft 26, and a light source, such as a light bulb 36, and a light sensor, such as a photo-diode 38, are mounted within the casing in a spaced apart relationship. At the forward end of the casing portion 20 there may be provided an inwardly extending housing 40 for receiving the light bulb 36, and the photo diode 38 may be bonded within the casing portion 20 just aft of the light bulb 36. Accordingly, a space 42 is provided in the aft portion of the casing 20 for a purpose which will be described more fully hereinafter.

Means, such as opaque projections 44 and 46, are mounted on the interior portion of the propeller shaft 26, and are movable through the space 42 between the light bulb 36 and the light photo diode 38 for coding the light transmitted to the photo diode 38 when the propeller 34 is rotated by fluid. As illustrated in FIG. 2, the projection 44 may progressively increase radially from the propeller shaft 26 from a point 48 to a point 50. The projection 46, which is spaced from the projection 44, may be simply a partial circular segment. The spacings between the projections 44 and 46 are unequal, that is the spacing from 46 to the point 50 to the point 48 are unequal. The projections 44 and 46 provide a double coding due to this unequal spacing and the progressive radial increase of the projection 44. If desired, a pair of projections similar to the projection 46, but unequally spaced would provide single coding.

Another embodiment of the invention is to utilize merely the projection 44, as illustrated in FIG. 3, which would result in a single coding. The single coding of the projection 44 results in a gradual build-up or reduction of the light sensed by the photo diode 38 depending upon the rotation of the propeller shaft 26. The utilization of both projections 44 and 46, as illustrated in FIG. 2, results in an additional response due to the projection 46. In both embodiments velocity and direction of the flow of the fluid passed the propeller 34 can be determined from the light received by the photo diode 38.

An exemplary circuit diagram for the velocity indicator 10 is illustrated in FIG. 4 wherein the light bulb 36 and photo diode 38 are connected in parallel and powered by a battery 52. A recorder 54 is connected in series with the light photo diode 38 and will indicate the velocity and direction of fluid flow upon receiving the output from the photo diode 38. The velocity indicator 10 can be calibrated by subjecting it to various known velocities of fluid flow and corresponding the indications received on the recorder 54. The wires extending from both the light bulb 36 and the photo diode 38 may be bonded within the rear portion 20 of the casing and may exit at the aft end thereof in a cable 56.

The velocity indicator 10 may be mounted within a fluid flow by many well known means, however, an exemplary mounting means is illustrated in FIG. 1. The mounting means may include a generally tubular shaped housing 58 which is joined to the rear portion 20 of the casing by a bolt 60 and sealed thereto by O-rings 62. Radial projections 64 and 66 may extend from the tube 58 for attachment to a model being tested or sides of a weir as the situation dictates.

It is now readily apparent that the present invention provides a fluid velocity indicator which can be constructed with a minimum of shaft friction. This has been accomplished by utilizing the optical technique as described hereinabove. Further, the velocity indicator has been provided with means for interrupting the light according to a code so that direction of the fluid flow can be determined along with the fluid velocity.

Obviously many modifications and variations of the present invention are possible in the light of the above teachings. It is therefore to be understood that within the scope of the appended claims the invention may be practiced otherwise than as specifically described.

I claim:
1. A fluid velocity indicator comprising:
a casing having fore and aft ends;
a propeller shaft rotatably mounted through the fore end of the casing with portions of the shaft extending exterior and interior the casing;
a propeller mounted on the exterior portion of the shaft;
a light source and a light sensor mounted within the casing in a spaced apart relationship;
means mounted on the interior portion of the propeller shaft and movable through the space between the light source and the light sensor for coding the light transmitted to the light sensor when the propeller is rotated by fluid;
the coding means including a pair of spaced apart projections; the spacings between the projections being unequal and one of the projections progressively increasing radially from the propeller shaft, whereby light sensed by the light sensor will enable indication of velocity and direction of fluid flow past the propeller.

2. A fluid velocity indicator comprising:
a casing having fore and aft ends;
said casing having a generally solid rear portion and a forward hollow resilient cap portion which is ballistically shaped;
the solid rear portion of the casing having an annular groove and the cap portion having an inwardly extending lip so that the cap mounts on the solid rear portion by snap engagement of the lip into the annular groove;
a propeller shaft rotatably mounted through the cap portion with portions of the shaft extending exterior and interior the casing;
a first bearing disposed in the rear casing portion for receiving the interior end of propeller shaft, and a second bearing fixedly mounted on the interior portion of the propeller shaft for retaining the shaft end in the first bearing and preventing forward movement of the shaft;
a light source and a light sensor mounted within the rear casing portion in a spaced apart relationship;
a pair of spaced apart opaque radial projections mounted on the interior shaft portion between the light source and the light sensor;
the spacing between the projections being unequal and one of the projections progressively increasing radially from the propeller shaft for double coding the light transmitted to the light sensor,
whereby light sensed by the light sensor will enable indication of velocity and direction of fluid flow past the propeller.

* * * * *